Figure 1:
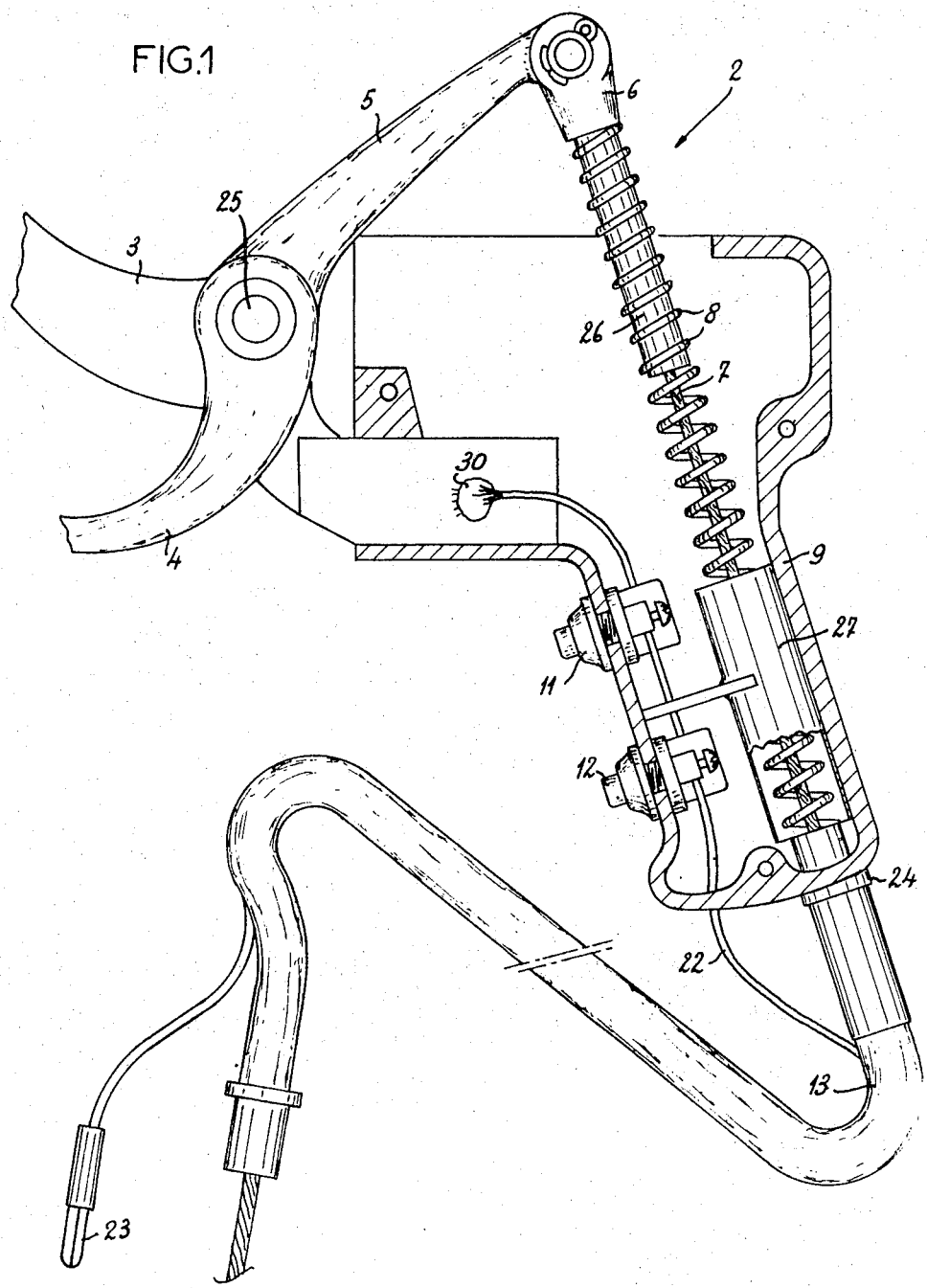

United States Patent [19]
Caire

[11] 3,834,020
[45] Sept. 10, 1974

[54] SHEARS
[75] Inventor: Roger Caire, Villeurbanne, France
[73] Assignee: Societe D'Exploitation D'Outillage ET Usinage De Precision Georges Froquet sigle S.E.O.U.P., Vaulx-en-Velin, Rhone, France
[22] Filed: Nov. 17, 1972
[21] Appl. No.: 307,559

[30] Foreign Application Priority Data
Nov. 19, 1971 France.......................... 7142180

[52] U.S. Cl. ............................................. 30/228
[51] Int. Cl. .......................................... B26b 15/00
[58] Field of Search ......... 30/180, 210, 228; 310/50

[56] References Cited
UNITED STATES PATENTS
| | | | |
|---|---|---|---|
| 3,177,584 | 4/1965 | Cockerill | 30/228 |
| 3,401,455 | 9/1968 | Gebauer | 30/228 |
| 3,561,117 | 2/1971 | Murbach | 30/228 |

FOREIGN PATENTS OR APPLICATIONS
861,041    2/1961    Great Britain ........................ 30/210

Primary Examiner—Al Lawrence Smith
Assistant Examiner—J. C. Peters
Attorney, Agent, or Firm—Karl F. Ross; Herbert Dubno

[57]    ABSTRACT

A pair of shears, scissors or the like comprise a pair of series-connected switches in its handle for controlling the energization of a solenoid valve disposed between a hydraulic servomotor and a pump supplying high-pressure fluid thereto; the pump is operated by an electric motor mounted on a carriage and the movable arm of the shears is connected via a cable protected by a sheath to the piston rod of the cylinder. The energizing circuit for the solenoid includes a wire extending along the cable sheath.

4 Claims, 2 Drawing Figures

SHEARS

The present invention relates to cutting impelements such as averruncators, prunning-scissors, shears or the like (to be referred to hereinafter as "shears" for short).

Hand-operated shears have been known for centuries. They are advantageous on account of their light weight and handiness, but in case of intense service, e.g., for cutting vines, their use is tiresome for the operator's hand.

The shears according to this invention are intended for avoiding this inconvenience. To this end, power means connected to the shears through a flexible cable enclosed in a sheath facilitate greatly the use thereof by providing, at the operator's command, the power necessary for shearing the plants or other objects to be cut.

According to a preferred embodiment of this invention the power means comprise in combination a motor, a hydraulic high-pressure pump and a fluidic servomotor or jack connected on the one hand to the pump via a solenoid-operated valve and on the other hand to the shears via a sheath guiding a traction cable for transmitting the movement of the jack piston to the shears; the solenoid-operated valve is controlled by means of a pair of circuit-closing monostable switches mounted in series so as to close the solenoid circuit by using ground as a return conductor, the shears and the jack being restorable to their initial position with the aid of compression springs.

This arrangement greatly reduces the fatigue normally caused to the operator inasmuch as the use of my improved shears, when cutting plants, vines or other articles, is virtually effortless.

Figure 2:
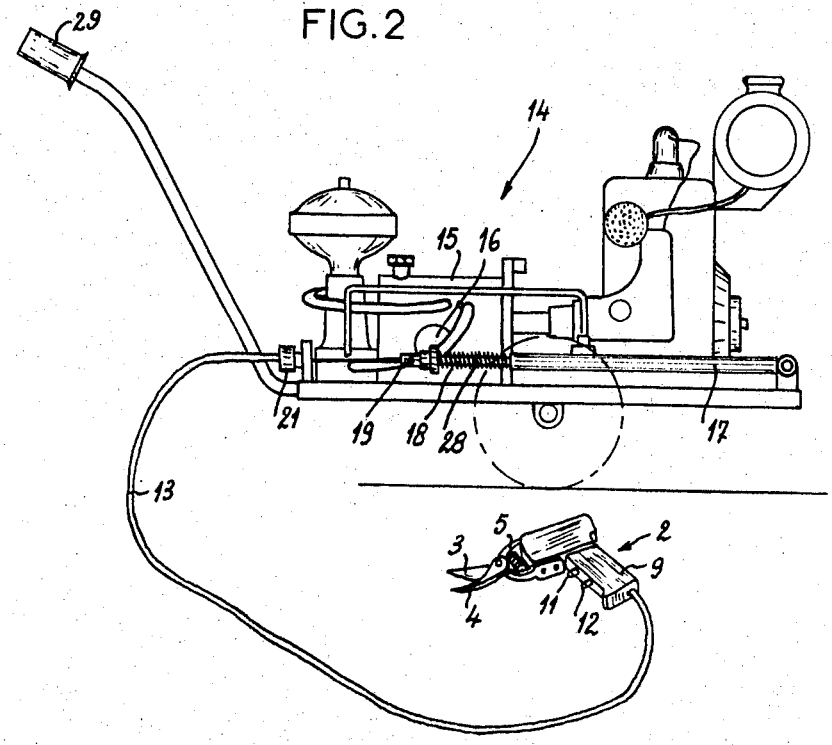

A clearer understanding of this invention will be had as the following description proceeds with reference to the attached drawing illustrating diagrammatically by way of example a typical embodiment of the invention. In the drawing:

FIG. 1 is a plan view from above of the improved power-operated shears according to my invention; and FIG. 2 is an elevational view showing a power-unit-supporting carriage associated with the shears of FIG. 1.

The shears 2 comprise a pair of blades 3, 4, an arm 5 integral with blade 4, a link 6, a traction cable 7, a return spring 8, a grip or handle 9, a pair of monostable circuit-closing switches 11, 12 and a cable sheath 13.

The power unit for operating the shears 2 mounted on a carriage 14, comprises a hydraulic fluid-pressure generator 15, a solenoid-operated valve 16, a single-acting hydraulic servomotor or jack including a cylinder 17 and a piston provided with a piston rod 28, a return spring 18 for this piston, a link 19 and a union 21 for the sheath 13.

The shear blade 3 is rigidly connected to the handle 9 supporting the monostable switch 11 associated with another monostable switch 12 for safety reasons. These two switches 11 and 12, shown as pushbuttons, are mounted in series in an energizing circuit comprising a conductor 22 having one end grounded at 30, on handgrip 9 and the other end connected to a plug 23 adapted to engage a corresponding current source, in the form of a socket 29, on carriage 14. This conductor 22 may be either disposed along the outer surface of sheath 13 or, preferably, embedded in another sheath concentric with cable sheath 13 so as to improve the protection thereof. On the other hand, the handle 9 carries a union 24 for attaching the sheath 13 receiving the traction cable 7 connected to the pivoted arm 5 via link 6. The arm 5 is urged toward its initial position, together with the blade 4 rigid therewith, by the spring 8 guided by a shank 26 rigid with the link 6 and also by a sleeve 27 rigid with handle 9.

When the user desires to operate the shears 2, he depresses the knobs of switches 11, 12 so as to complete a ground return for the electric circuit controlling the energization of the solenoid associated with the valve 16; thus, this valve is opened to unblock the high-pressure hydraulic circuit, and fluid under pressure is allowed to flow into the piston chamber of cylinder 17. The piston rod 28 of this cylinder is thus retracted and entrains the cable 7 to which it is connected via strap link 19, thereby pivoting the arm 5 and closing the shears 2.

If the operator releases one of the control knobs of switches 11, 12, the electric circuit is opened and the solenoid associated with valve 16 is de-energized. Thus, this valve 16 resumes its inoperative position in which it cuts off thie high-pressure fluid supply and vents the piston chamber of cylinder 17 to the atmosphere. Spring 18 returns the piston rod 28 to its initial position while spring 8 of shears 2 restores the cable 7 and therefore the movable shear blade 4 to their initial position.

Of course, various modifications may be brought to the specific embodiment described and illustrated herein, without departing from the basic principle of the invention as set forth in the appended claims.

What is claimed is:

1. A cutting implement comprising:
   a handgrip;
   a pair of coacting blades including a first blade rigid with said handgrip and a second blade pivotally connected with said first blade;
   a power unit remote from said handgrip including a fluid-pressure generator, a fluidic servomotor connected to said generator for displacement by fluid pressure from a normal position, biasing means tending to maintain said servomotor in said normal position, and electrically actuatable valve means operable to admit fluid from said generator to said servmotor;
   a sheathed traction cable extending from said servomotor to said second blade for imparting cutting motion thereto upon displacement of said servomotor from said normal position, said second blade being provided with restoring means opposing said cutting motion;
   an energizing circuit for said electrically actuatable valve means including a current source at said power unit and a wire extending from said power unit along said sheathed cable to a grounding contact on said handgrip; and
   switch means on said handgrip normally disconnecting said wire from said grounding contact, said switch means being manually operable to establish a temporary connection between said wire and said grounding contact for actuating said valve means.

2. A cutting implement as defined in claim 1 wherein said switch means comprises a pair of juxtaposed switches electrically in series with each other.

3. A cutting implement as defined in claim 2 wherein said switches are pushbuttons.

4. A cutting implement as defined in claim 1 wherein said power unit comprises a carriage supporting said generator, said servomotor and said valve means.

* * * * *